United States Patent
Turner

[11] 3,785,103
[45] Jan. 15, 1974

[54] BUILDING PANEL WITH LATCHING MEANS

[76] Inventor: Hamish Turner, 576 Otis Blvd., Spartanburg, S.C.

[22] Filed: Jan. 3, 1972

[21] Appl. No.: 214,538

[52] U.S. Cl.................. 52/309, 52/127, 156/90, 161/161
[51] Int. Cl............................................ E04b 1/41
[58] Field of Search.................... 52/127, 300, 584; 161/161, 159, 160; 156/90

[56] References Cited
UNITED STATES PATENTS

| | | | |
|---|---|---|---|
| 2,770,406 | 11/1956 | Lane | 161/161 |
| 2,907,383 | 10/1958 | Kloote | 161/161 |
| 3,003,810 | 10/1961 | Kloote | 161/161 |
| 3,400,958 | 9/1968 | Haimes | 287/189.36 R |
| 3,353,314 | 11/1967 | Melcher | 52/127 |
| 3,365,851 | 1/1968 | Cushman | 52/127 |
| 2,972,559 | 2/1961 | Allen | 161/161 |

*Primary Examiner*—John E. Murtagh
*Attorney*—Wellington M. Manning, Jr.

[57] ABSTRACT

An improved building panel is disclosed comprising a foam core having bonded to opposite sides thereof an outer skin or cover plate. The outer skins are bent along the two longwise edges thereof and receive a wooden edging member therebetween, the edging member being bonded to both the outer skins and the foam core. The edging members are preferably tongue and groove, i.e., having a tongue construction along one longitudinal edge of the panel and a groove construction along the opposite longitudinal edge of the panel. The tongued edging has a plurality of latch means disposed therealong while the grooved edge has a plurality of matching latch pins disposed therealong, said tongue and groove construction and latches and latch pins enabling a rigid connection between adjacent panels. A superior panel is produced that avoids delamination under extreme conditions. The bond is produced by a two adhesive system. A first adhesive is applied to the foam core and a second adhesive is applied to the outer skins and edging members. The foam core adhesive must be compatible with the foam and the second adhesive and preferably is a water base polychloroprene adhesive. The second adhesive, applied to the outer skin and edging is a solvent based adhesive which is normally incompatible with the foam. When the two adhesives are brought together in a virtually non tacky state, however, the foam core adhesive prevents destruction of the foam by the solvent based adhesive and, upon curing, the two adhesives provide a superior laminate bond. A process for manufacturing the panel is also disclosed and claimed.

7 Claims, 6 Drawing Figures

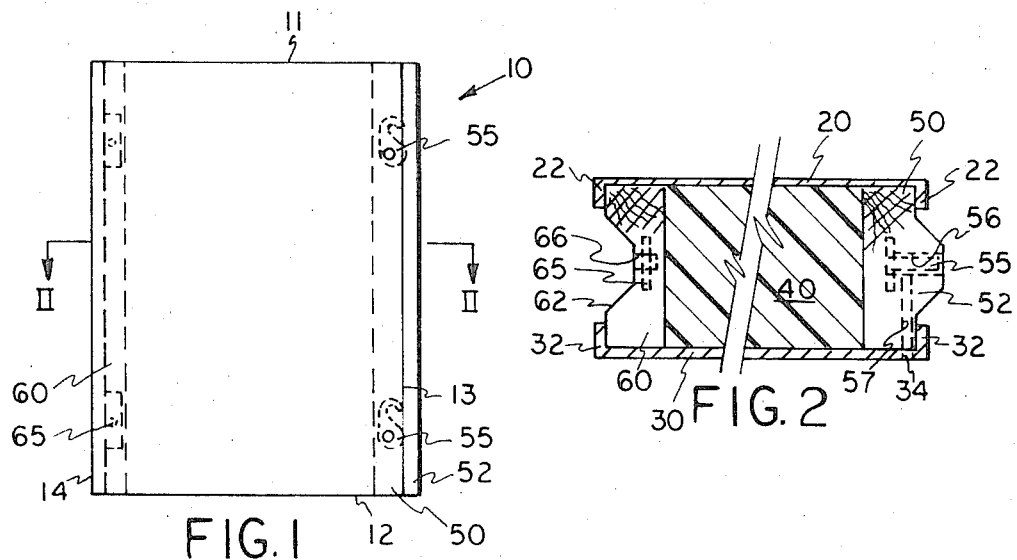
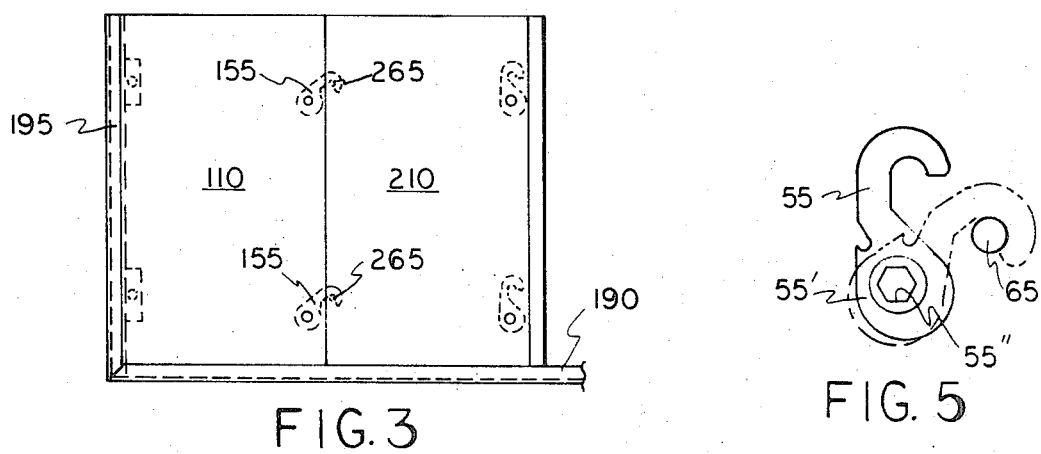
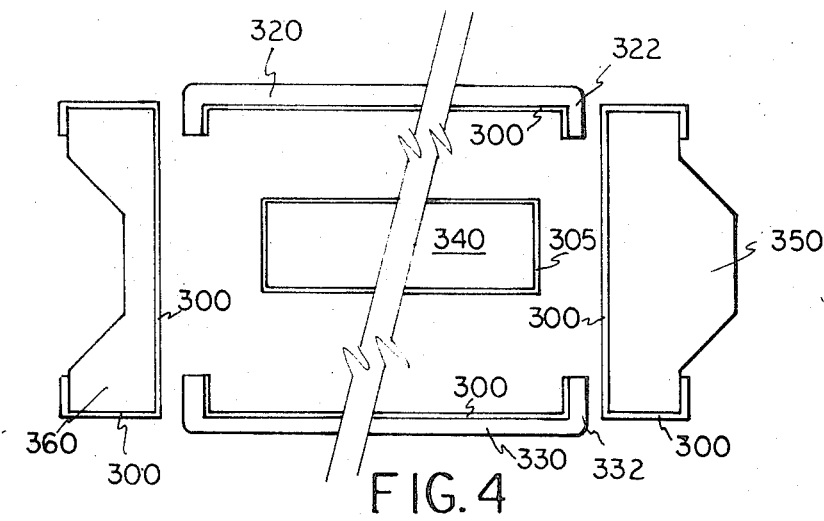

BUILDING PANEL WITH LATCHING MEANS

BACKGROUND OF THE INVENTION

Modular and prefabricated building construction has in general led to the development of building panels of the type described herein. These panels were first fabricated from wood and filled with a discrete insulating material. The wooden panels were then out moded by stronger, more decorative and more useful metal skin panels having honeycomb or foam cores therein for strength and insulation purposes. These panels were manufactured for ready connection to other panels to enable quick and simple construction on the job site. Generally, some type latch or hook means was incorporated into the panel to provide a tensioned connection between adjacent panels, the latch or hook being actuated by a wrench or similar tool passing through an appropriate opening in the panel skin to engage and manipulate the latch into engagement with a bar or the like in an adjacent panel.

Once the honeycomb and foam core panels came into existence, improvements began to appear as to various aspects of the general panel structure. For example, improved latches were developed, the improvements relating to the latch mechanism per se, means for actuating a plurality of latches, reinforcing means for securing the latches within the panel, and the like. Further, improvements were made to the edge members employed, insofar as the shapes thereof, materials of construction, means to unite same to the panel core, and the like. Improvements were made to the foam and honeycomb cores to the skins, and in general to all areas and components of the panels.

After all the improvements mentioned above, problems continue to exist with the building panels. A major problem continually experienced is delamination of the outer skins from the core. Delamination lessens the rigidity of the panel and hence the strength of the panels. Likewise, heat and sound insulation qualities are affected as are possibly the aesthetics of the panel. Many panels are also burdened with the formation of condensation on the inside thereof. This condensation comes from a thermal path through the panel permitting cold air from the outside to pass through the panel and condense upon exposure to the warmer inside air. Forces incurred during connection of one panel to an adjacent panel oftentimes loosen or separate the latch means from the panel, thus for all practical purposes, destroying the usefulness of the panel. This weakness leads to improper seals at the panel junctions.

The panel of the present invention overcomes the above noted disadvantages and deficiencies of existing panels and definitely represents a technological advance in the state of the panel art. The present panel has improved strength and rigidity; forms a more rigid and tighter connection with adjacent panels; affords excellent heat and sound insulation without the production of moisture condensation on the inside of a building produced from the instant panels; and possesses excellent delamination qualities. Likewise, the process for producing the present panel to achieve the improved panel properties is simple and inexpensive so as to improve the economics of the system.

The prior art is devoid of any teaching or suggestion of the present panel or the process for producing same. As mentioned above, a tremendous amount of effort has been expended towards building panel improvement. These efforts are exemplified by the following U. S. Pat. Nos. 2,323,336 to Knorr; 2,347,211 to Merrill et al; 2,410,053 to Drew; 2,430,987 to Lindner et al; 2,537,982 to Finn; 2,564,735 to Stockwell; 2,610,162 to Hoffman, and 2,610,910 to Thomson.

SUMMARY OF THE INVENTION

It is an object of the present invention to provide an improved building panel.

Another object of the present invention is to provide an improved foam core building panel having excellent delamination properties.

Another object of the present invention is to provide an improved building panel that avoids the formation of moisture condensation on the inside wall thereof while at the same time producing an air and water tight joint with an adjacent panel in a building structure.

Still further, another object of the present invention is to provide a novel process for the production of a building panel.

Generally speaking, the panel of the present invention comprises first and second outer members, said outer members having a solvent based adhesive layer on one side thereof, a foam core, said foam core having a different adhesive layer on sides thereof to be bonded, said foam adhesive being compatible with the foam core; and edging members disposed along longitudinal edges of said outer members and said core, said edging members having a solvent based adhesive layer on surfaces thereof to be bonded, said solvent based adhesive and said different adhesive being cocured to bond said outer members to said core and said edging members to said core and said outer members.

The panel of the present invention more specifically comprises a foam core, preferably a closed cell polystyrene or equivalent foam to which is bonded metal or other outer skins on opposite sides thereof. The skins are preferably a thin gauge aluminum or steel that are securely bound to the foam core and provide a low maintenance surface. Both outer skins are turned in along the longitudinal edges thereof. Opposite longitudinal edges of the panel are provided with edge members that are partially enveloped by the inturned edges of the outer skins and are adhesively bonded to both the outer skins and the foam core. The edge members are preferably wood and most preferably a hard wood type such as fir, hemlock or the like. The edge members furthermore are preferably of tongue and groove construction thus permitting a solid, tight union between adjacent panels. A plurality of hook or latch members are also incorporated along one of the edge members while hooking or latching pins are received along the edge member on the opposite longitudinal edge of the panel. The panel can thus be joined to the next adjacent panel while the previously adjacent panel may be hooked to the instant panel so as to insure the solid, tight relationship therebetween. Upper and lower ends of the panel are normally left exposed though may be covered with a further wooden or other type strip if so desired. Due to the closed cell construction of the foam, however, no moisture or air passageways are provided that would normally require complete closure of the panel at the edges thereof.

The adhesive system used in manufacturing the instant panel is a major factor attributing to the improved properties thereof. Chemically, a foam core will not withstand attack by most volatile organic solvents found in solvent based adhesive systems. While the organic solvent based adhesives are preferred due to superior bonding properties to smooth metal surfaces such as are generally found on the outer skins of the panels, their incompatibility with the foam leaves a great deal to be desired. Moreover, even when dried to a non tacky state before contact with the foam, sufficient residual solvent remains that dissolution of the foam is probable. Dissolution of the foam after lamination thus produces a void in the core which lessens the insulating qualities of the panel, but most importantly aids delamination of the outer skin from the core.

The present dual adhesive system protects the foam core from the solvents and simultaneously produces a superior bond between the components of the panel. Such improvement is brought about by precoating the foam core with an adhesive that is compatible with the foam and cocures with the solvent based adhesive to produce a tenacious bonding medium. Though numerous polymeric adhesives have proved successful for lamination of the instant panel in the dual adhesive system, a polychloroprene or neoprene adhesive is preferred for both the solvent based adhesive for the outer skins and a water dispersed system for the foam core. Both adhesives are applied and dried to a substantially non tacky state before the components are assembled. Thereafter, the adhesives are cocured under temperature and pressure conditions to produce improved lamination of the panel.

The turned in edges along the longitudinal edges of the outer skins add to the aesthetic qualities of the panel, improve the strength of the skins and aid in holding the edge member in place. Moreover, the in turned edges permit a tighter than usual junction between adjacent panels, thus providing an improved seam thereat.

The process for producing the present panel affords improvement to the panel. Application of adhesive to all components, followed by the prescribed pressure and heat treatments permit production of panels having very few flaws therein. Production speeds are increased and panel quality is improved, thus affording an overall economic improvement to the operation.

BRIEF DESCRIPTION OF THE DRAWINGS

FIG. 1 is a side elevational view of a panel according to the teachings of the present invention.

FIG. 2 is an end cross sectional view of the panel according to the teachings of the present invention taken along lines II—II.

FIG. 3 is a side elevational view of two erected panels according to the teachings of the present invention.

FIG. 4 is an exploded end view as shown in FIG. 2 to more definitively depict the details thereof.

FIG. 5 is a side view of a suitable latch means for use with the panel of the present invention.

DESCRIPTION OF THE PREFERRED EMBODIMENTS

Figure 6:
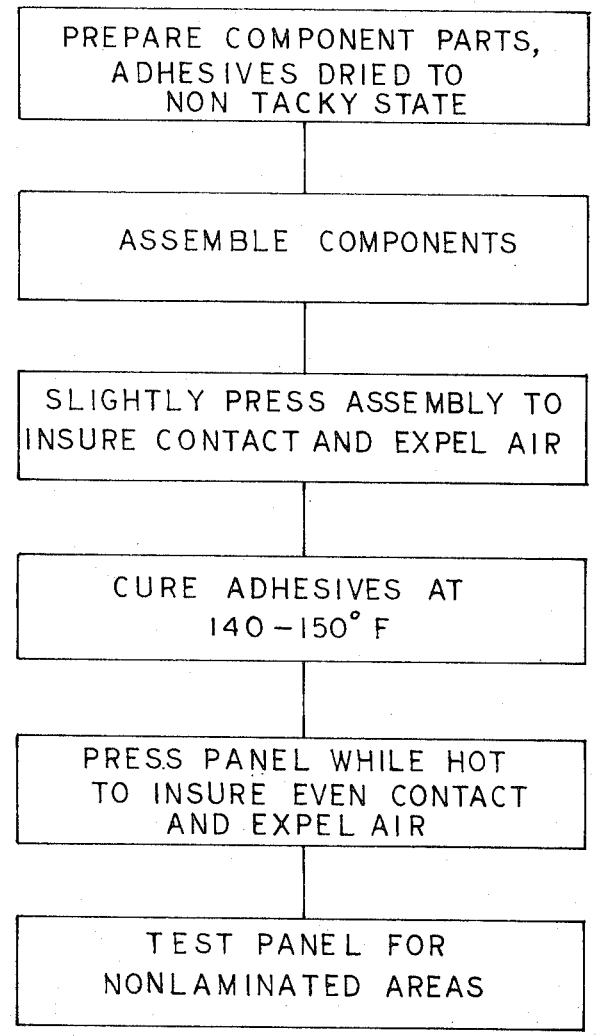
FIG. 6 is a block diagram of the process for producing panels according to the teachings of the present invention showing the particular steps thereof.

Referring to the Figures, preferred embodiments of the present invention will now be described in detail. FIGS. 1 and 2 generaly illustrate the panel of the present invention. A building panel generally indicated as 10 is shown having a top edge 11, a bottom edge 12 and longitudinal edges 13 and 14. Panel 10 is made up of outer skins 20 and 30, a foam core 40 and edge members 50 and 60. All of these components are united as discussed hereinafter to form a unitary structure. Outer skins 20 and 30 have in turned longitudinal edges 22 and 32 respectively which partially envelop edge members 50 and 60 and serve purposes to be discussed hereinafter.

Edge members 50 and 60 extend the entire length of panel 10 and are adhesively bonded to foam core 40 and to outer skins 20 and 30, including the area along in turned edges 22 and 32. Edge members 50 and 60 are of unitary structure and preferably constructed of a material that is light, structurally strong to provide rigidity to the panel and to hold latch means against forces produced during joining of adjacent panels, and at least partially insulative. The aforementioned requisites are best met by wood, especially a hard wood as is exemplified by fir and hemlock. Fir and hemlock are preferred materials of construction for edge members 50 and 60.

As can best be seen in FIG. 2, edge member 50 is shaped to have a tongue 52 extending therefrom, while edge member 60 along an opposite longitudinal edge 14 of panel 10 possesses a depressed area or groove 62 therealong. Tongue 52 of edge member 50 extends beyond longitudinal edge 13 of panel 10 and during erection of a structure resides within a complementary groove 62 of an edge member 60 of a next adjacent panel. Edge member 50 further has a plurality of latch means 55 disposed along the length thereof. Latch means 55 which will be fully described hereinafter are received in slots 56 provided therefor in edge member 50 and rigidly secured therein. Edge member 60 has a like number of latch pins 65 securely received in slots 66 provided therefor. Hence when joining two adjacent panels, tongue 52 moves into groove 62 of an adjacent panel and latch means 55 is actuated to pivot out of slot 56 and into holding engagement with latch pins 65 in slot 66 of the abutted edge member 60.

Latch means 55 and latch pins 65 are illustrated without panel structure in FIG. 5. Latch 55 is shown in solid lines in an unconnected position with latch pin 65 adjacent thereto. Latch pin 55 is pivotally mounted in edge member 50 around a pin 55' having a hexagonal or other type socket 55'' therein. Socket 55'' is in alignment with a tool receiving opening 57 in edge member 50 and a tool receiving opening 34 in outer skin 30. When adjacent panels are forced into abutting relationship a tool of cross section like socket 55'' may be passed through openings 34 and 57 and inserted into socket 55''. Turning of the inserted tool, then causes latch 55 to pivot around pin 55' and into holding engagement with latch pin 65 of an adjacet panel. Latch means 55 not only engages latch pin 65, but upon continued rotational movement of the latch means, the panels move together into a tight fitting relationship. Such holding engagement is shown in phantom in FIG. 5. The reverse procedure disconnects the panels. While the above type latching arrangement is preferred, any other suitable latch mechanism may be employed that will unite adjacent panels in a structurally sound relationship.

Referring to FIG. 3, a pair of panels 110 and 210 are shown in side by side relationship with opposite longitudinal edges thereof in abutting relationship. Latch means 155 of panel 110 are shown in engagement with latch pins 265 of panel 210 thus locking the two panels together to form a structural assembly. Panels 110 and 210 are shown supported in an extruded, slotted member 190 and panel 110 is received in a similar slotted member 195 along its longitudinal length. In erecting a structure with panels according to the present invention, such extruded members 190 and 195 are secured to the structure base or foundation (not shown). Panels 110, 210, etc. are then received along the slots of the extruded member, are joined by the latch mechanism and are affixed to the slotted members in suitable fashion such as by self threading screws or the like (not shown). In such a manner a structure can be quickly erected with a minimum amount of time and labor. Panels according to the present invention also may be used to produce a roof, or any other part of the overall structure. Likewise, window and door frames may be incorporated into the instant panel with the window and door secured therein.

In erecting a structure from the panels, it may be desirable to insure complete blockage of air and moisture at the joints. While the panels per se, form a very tight and rigid joint sealers may be applied if desired. Such sealers may be used along one of the longitudinal edges of the panel only and then only along the in turned edges of the outer skins. A sealer so employed will insure a completely air and moisture impervious joint between panels.

An exploded view of a panel cross section is shown in FIG. 4. Outer skins 320 and 330 are shown having in turned edges 322 and 333. The inside of both skins is shown having a solvent based adhesive layer 300 thereon. A foam core 340 is shown between outer skins 320 and 330 and is provided with an adhesive layer 305 therearound. Edge members 350 and 360 are also provided with an adhesive layer 300 presented on those areas thereof to be bonded to another component of the panel. Thus when the component parts shown in FIG. 4 are assembled as shown in FIG. 2, and the assembly is subjected to the appropriate process conditions, a finished panel results.

Adhesives for use in producing the present panel are quite important as mentioned above. Numerous adhesive systems have been heretofore employed to laminate an outer skin to a foam core, honeycomb or the like. In general these adhesives have met with a moderate degree of success. The present adhesive system, however, insures good and complete bonding of virtually every panel produced without the danger of subsequent delamination under normal use. Many solvent based adhesive compositions are known to bond well to smooth metals and the like as might be used as outer skins. The solvents referred to are volatile, organic solvents, which would normally attack a foam core. These adhesives have thus not previously been satisfactory in the production of foam core panels. As taught herein, solvent based adhesives can be successfully employed in the production of foam core panels when the solvent is blocked from contact with the foam. The blocking agent should, however, likewise be an adhesive to permit proper lamination of the component parts of the panel and the particular adhesive employed should be compatible with the foam core. It has been found that a water based adhesive composition will accomplish the intended result, and preferably a water based adhesive of the same type employed on the other components.

A suitable solvent based adhesive for application to components other than the foam core is Scotch-Grip brand Contact Cement No. 2218 manufactured by Minnesota Mining and Manufacturing Company, St. Paul, Minnesota. Likewise a suitable water dispersed adhesive for application to the foam core is Scotch-Grip brand Contact Cement No. 2226, also manufactured by Minnesota Mining and Manufacturing Company, St. Paul, Minnesota. Both of these adhesives are polychloroprene adhesives containing a phenolalehyde resin and are of the type described in U. S. Pat. No. 2,610,910 to Thomson. The above Scotch-grip brand adhesives are preferred and the physical characteristics of same are set forth below in Table 1.

TABLE 1

|  | Water Dispersed Adhesive | Solvent Based Adhesive |
| --- | --- | --- |
| Base | polychloroprene | polychloroprene |
| Solvent | water | ketone, aromatic, aliphatic |
| Flash Point | none | −14°F. |
| Solids, % | 50 | 19 |
| Viscosity, cps | 400 | 240 |

The main criteria for the adhesive system is that a good bond be realized, and that the foam core adhesive protect the foam from the solvent based adhesive.

Having described the panel of the present invention, the process for manufacturing same will now be described in detail with reference to FIG. 6. Outer skins 20 and 30 are cut to size and the longitudinal edges turned up. The solvent based adhesive is then applied by spraying, rolling or brushing to the inside of the outer skins and air dried to a substantially non tacky state. Edge members 50 and 60 are routed and latch means 55 and latch pins 65 installed in the routed areas. A solvent base adhesive is applied to those areas of the edge members to be bonded and the adhesive dried to a substantially non tacky state. Foam core 40 is coated on at least all sides thereof to be bonded with the compatible protective adhesive, preferably a water dispersed polychloroprene adhesive, and the adhesive is dried to a substantially non-tacky state. Adhesive application is by rolling, brushing or spraying.

Assembly of the components is the next step in the operation. An outer skin 20 is placed, adhesive side up on a make up table. Edge members 50 and 60 are then placed on outer skin 20, abutting opposite up turned edges 22. Foam core 40 is placed onto the adhesive layer of outer skin 20 and pressed against same to insure even and complete contact. Outer skin 30 is then placed onto foam core with in turned ends 32 abutting edge members 50 and 60.

The panel assembly is then moved by a conveyor to a pair of steel pressure rolls, the rolls being set at a dimension to impart only pressure to the assembly sufficient to further insure even contact between the components and to expel entrapped air. After initial pressing, the panel is fed to a driven conveyor operating in conjunction with a tunnel oven. While operating speed of the conveyor is related to curing temperature, a speed of about 2 feet per minute has proved quite successful in a temperature range of 140° to 150° F. The panel is thus received by the driven conveyor and carried through the curing over where heater coils apply heat to both sides of the panel. Immediately subsequent to the curing oven, the panel is fed between two rubber pressure rollers, the rollers being set at a distance apart to apply sufficient pressure to the panel to again insure even bonding between the components and to further expel entrapped air from within the panel.

Subsequent to the second roller press operation, the panel is tapped with a rubber instrument in random fashion. Any nonlaminated area is located by a hollow sound at impact.

In practicing the process of the present invention a panel was constructed as follows. Outer skins were prepared in 4 foot by 8 foot size of 22 gauge steel having a one half inch in turn along opposite longitudinal edges. Fir edge members were produced of the shape shown in the Figures and having latch means and latch hooks spaced therealong every 4 feet of length. Pertinent sides and edges of the outer skins and edge members were coated with Scoth-Grip brand Contact Cement No. 2226. A proper sized polystyrene foam core was brush coated completely with Scotch-Grip brand Contact Cement No. 2218. All components were dried until the adhesives were substantially non tacky. The panel was then assembled as described above, passed between the steel rollers, cured at 145° F. at a rate of 2 feet per minute, and passed hot through rubber pressure rollers. After exiting the last set of rollers, the panel was complete, looked fine and when tested with a rubber hammer, showed no delaminated areas, thus indicating a successful panel.

Having described the present invention in detail, it is obvious that one skilled in the art will be able to make variations and modifications thereto without departing from the scope of the invention. Accordingly, the scope of the present invention should only be determined by the claims appended hereto.

What is claimed is:

1. A building panel comprising:
   a. a foam core, said foam core having a water based adhesive on surfaces thereof to be bonded;
   b. a pair of outer members, said outer members having an organic solvent based adhesive on one side thereof, said solvent based adhesive being cocured with said water based adhesive to bond said outer members to said foam; and
   c. a pair of edge members, said edge members having an organic solvent based adhesive on surfaces thereof to be bonded, said solvent based adhesive on said edge members being cocured with adhesive on said foam and said outer members to bond said edge members to said foam and said outer members along opposite longitudinal edges thereof, one of said edge members having latch means incorporated therein and the other of said edge members having latch pin means incorporated therein.

2. A building panel as defined in claim 1 wherein said outer members are a thin gauge metal, said foam core is polystyrene and said edge members are hardwood.

3. A building panel as defined in claim 1 wherein said foam adhesive is a water dispersed polychloroprene adhesive.

4. A building panel as defined in claim 3 wherein said solvent based adhesive is a polychloroprene adhesive.

5. A building panel as defined in claim 4 wherein said one of said edge members has a tongue protruding therefrom along the length thereof and the other of said edge members has a tongue receiving groove along the length thereof.

6. A building panel comprising:
   a. a closed cell polystyrene foam core, said core having a water dispersed polychloroprene adhesive thereon;
   b. a pair of metal outer skins, said skins having a organic solvent based polychloroprene adhesive on one side thereof, said skins being bonded to opposite sides of said foam core, the adhesives on said core and said skins being cocured to form a bond therebetween, said skins further having in turned edges along opposite sides thereof;
   c. a first hardwood edge member received in an area defined by said foam core and said outer skins, said edge member having a tongue protruding therefrom and extending beyond said outer skin, said edge member having a organic solvent based adhesive composition thereon, said adhesive being cocured with the adhesives on said foam core and said outer skins to bond said edge member thereto; and
   d. a second hardwood edge member received in a further opposite area defined by said foam core and said outer skins, said second edge member having a tongue receiving groove therealong, said second edge member having a organic solvent based adhesive composition thereon, said adhesive being cocured with the adhesive on said foam core and said outer skins to bond said edge member thereto.

7. A building panel as defined in claim 6 wherein further said first edge member has a plurality of latch means incorporated therein along the length thereof and said second edge member has a like number of latch receiving means incorporated therein along the length thereof.

* * * * *